United States Patent [19]

Rubinstein

[11] 4,260,855
[45] Apr. 7, 1981

[54] TELEPHONE TIMER DEVICE

[76] Inventor: Morton K. Rubinstein, 14954 Corona Del Mar, Pacific Palisades, Calif. 90272

[21] Appl. No.: 46,656

[22] Filed: Jun. 8, 1979

[51] Int. Cl.³ .............................................. H04M 1/21
[52] U.S. Cl. .............................. 179/7.1 R; 179/2 TC; 368/4
[58] Field of Search ............ 179/7.1 R, 7.1 TP, 2 TC; 58/152 T, 145 K, 74, 39.5, 23 AC, 24 A

[56] References Cited
U.S. PATENT DOCUMENTS

| | | | |
|---|---|---|---|
| 3,320,366 | 5/1967 | Plummer | 179/7.1 TP |
| 3,512,355 | 5/1970 | Lang | 179/7.1 R |
| 3,769,463 | 10/1973 | Graham et al. | 179/7.1 R |
| 3,950,935 | 4/1976 | Naito | 58/74 |
| 4,058,971 | 11/1977 | Epperson | 58/74 |
| 4,163,360 | 8/1979 | Tanaka et al. | 58/39.5 |

*Primary Examiner*—Gerald L. Brigance
*Attorney, Agent, or Firm*—Jack M. Wiseman; Francis W. Anderson

[57] ABSTRACT

An improved telephone timer device which is adapted to be conveniently and readily situated beneath or near a telephone is disclosed. The timer device serves as an automatic stop-clock for telephone calls as well as a manual stop-clock which may be used to measure the time devoted to chores or jobs for which a time record is desired. Display control permits a clock or actual time to be displayed instead of either the time duration of a telephone call or job.

10 Claims, 4 Drawing Figures

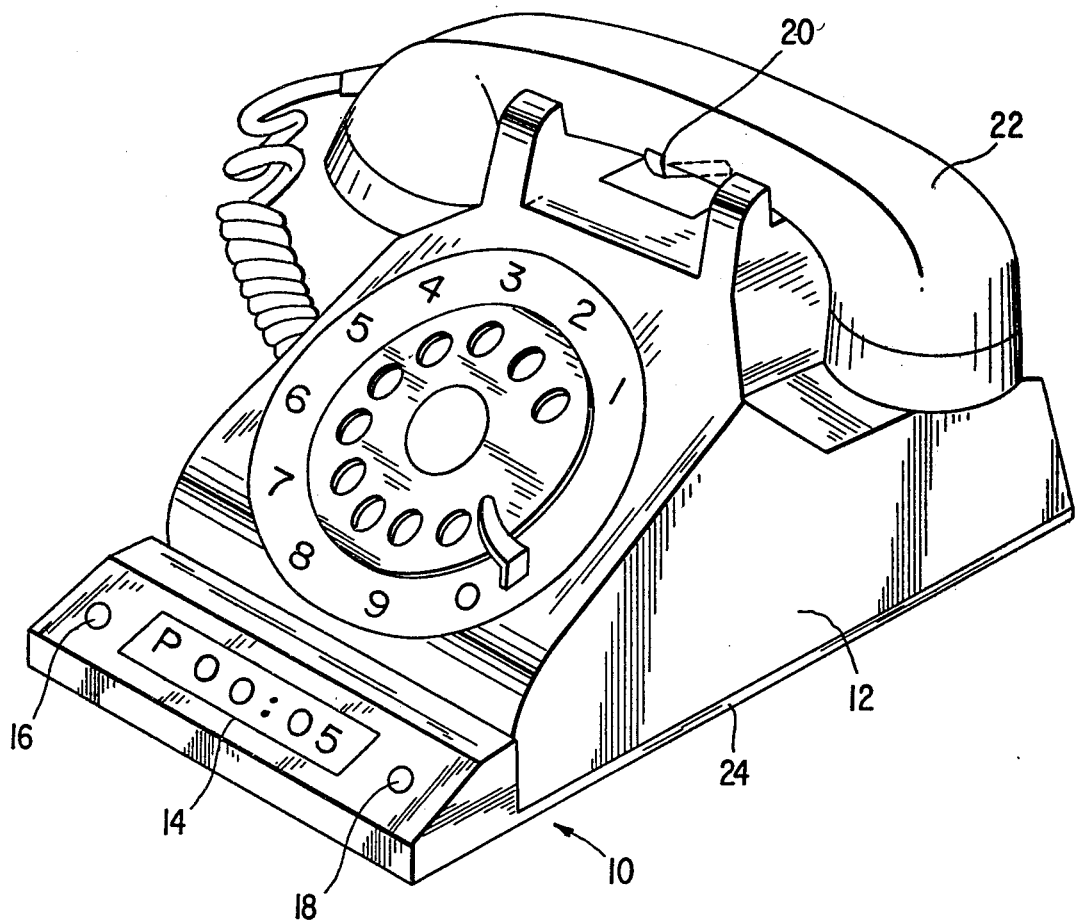

TELEPHONE TIMER DEVICE

BACKGROUND OF THE INVENTION

This invention generally relates to clock timer devices intended for use with a telephone.

Numerous stopwatch-like mechanisms have been heretofore designed for use with telephones to satisfy the need of certain professionals for accurate time records. An example would be the need of attorneys, accountants, doctors, architects, and the like whose services are billed on a time basis.

The numerous devices previously developed have tended to be either extremely complex and, hence, costly to manufacture and expensive to the consumer, or extremely simple and unsatisfactory from the standpoint of capabilities and performance. Among the more complex devices are systems which involve a substantial size unit, including a multiplicity of keys by which client code numbers, job code numbers and a variety of other notations may be stored in a computer-like memory and/or printed on a paper tape along with the time information primarily desired. The simple devices may involve no more than a clock which may be started and stopped by the manual depression of a control button.

While each of the prior art devices presents a solution to the problem of having a convenient means for keeping accurate time records, the complex systems tend to provide a solution that is an expensive overkill, while the simple systems provide an inexpensive, ineffective device.

In the patent to Graham et al., U.S. Pat. No. 3,769,463, issued on Oct. 30, 1973, for Electronic Long-Distance Telephone Call Computer And Recorder, there is disclosed apparatus for automatically computing and recording the cost of long-distance telephone calls. An elapsed time indicator digitally displays the time period of the call. The patent to Graham et al. does not teach the provision of a manually operated time indicator digital display for displaying the time duration of a job in addition to the time duration of a telephone call.

The patent to Epperson, U.S. Pat. No. 4,058,971, issued on Nov. 22, 1977, for Digital Wristwatch And Stopwatch discloses a digital wristwatch in which is digitally displayed horological information and the time duration of a start-stop sequence. In the patent to Epperson, there is no teaching of digital display for displaying the time duration of a telephone call in addition to the time duration of a start-stop sequence.

The patent to Lang, U.S. Pat. No. 3,512,355, issued on May 19, 1970, for Telephone Timing Device discloses a telephone timing apparatus in which a switch is responsive to the movement of a telephone cradle plunger for digitally displaying the time duration of a telephone call. The patent to Lang does not teach the combination of a digital display of the time duration of a telephone call and the digital display of the start-stop sequence to show the duration of a job or the like.

In the patent to Plummer, U.S. Pat. No. 3,320,366, issued on May 16, 1967, for Communication Metering And Registering Apparatus, there is disclosed a pressure sensitive switch operable from the use of a telephone handset to record the time duration of a telephone call. The patent to Plummer does not teach the combination of a digital display of the time duration of a telephone call and the digital display of the start-stop sequence to show the duration of a job or the like.

Lastly, the patent to Naito, U.S. Pat. No. 3,950,935, issued on Apr. 20, 1976, for Chronograph Wristwatch discloses an electronic timepiece having a digital display for displaying chronograph information and start-stop durations. A selector switch selectively connects switches to divider circuits in response to a setting of a mode switch. The opening and closing of the mode switch is coordinated with the operation of another selector circuit. The patent to Naito does not disclose the combination of a digital display of the time duration of a telephone call and the duration of a start-stop sequence.

Applicant had filed on Aug. 22, 1977, Ser. No. 826,361, an application entitled "Telephone Timer Device", which application has been abandoned.

SUMMARY OF THE INVENTION

A time display device for use with a telephone subscriber handset in which there is an automatic call time duration mode display of a telephone call and a manual start-stop duration mode display selected by a display mode selector switch. The display mode selector switch produces pulses which change the state of a counter for selecting for display either the call time duration mode or the start-stop duration mode.

It is the object of the present invention to provide an improved telephone timer device that serves to permit accurate time keeping with respect to telephone calls as well as other jobs and which present measured time data along with actual time data in an efficient and effective manner.

It is another object of the present invention to provide an improved telephone timer device which may be readily physically associated with a telephone device without requiring internal modification of the telephone and without adding to the clutter of a desk or tabletop on which the telephone is situated.

It is a further object of the present invention to provide an improved telephone timer device which may be inexpensively manufactured and reasonably priced to the consumer.

Briefly described, the present invention is an improved telephone timer device which is designed to be situated beneath a telephone and operatively associated therewith by the mere positioning of a switch or sensor device for detecting when the telephone is in use.

More particularly, the subject invention involves a telephone device which includes a digital display, adapted to be switchable to present actual time, the duration of a telephone call or the duration of a job or chore being timed. A pair of control buttons are provided to permit easy selection of a desired display and for starting and stopping the timing of a job or chore.

A feature of the present invention is the automatic interruption of the interval time duration mode when the telephone call time duration mode is in operation.

DESCRIPTION OF THE DRAWINGS

FIG. 1 is a schematic diagram illustrating a perspective view of an improved telephone timer device in accordance with the present invention.

FIG. 2 is a schematic diagram illustrating an exemplary display of a job being timed.

FIG. 3 is a schematic diagram illustrating a display of actual time.

DESCRIPTION OF THE PREFERRED EMBODIMENT

Figure 4:
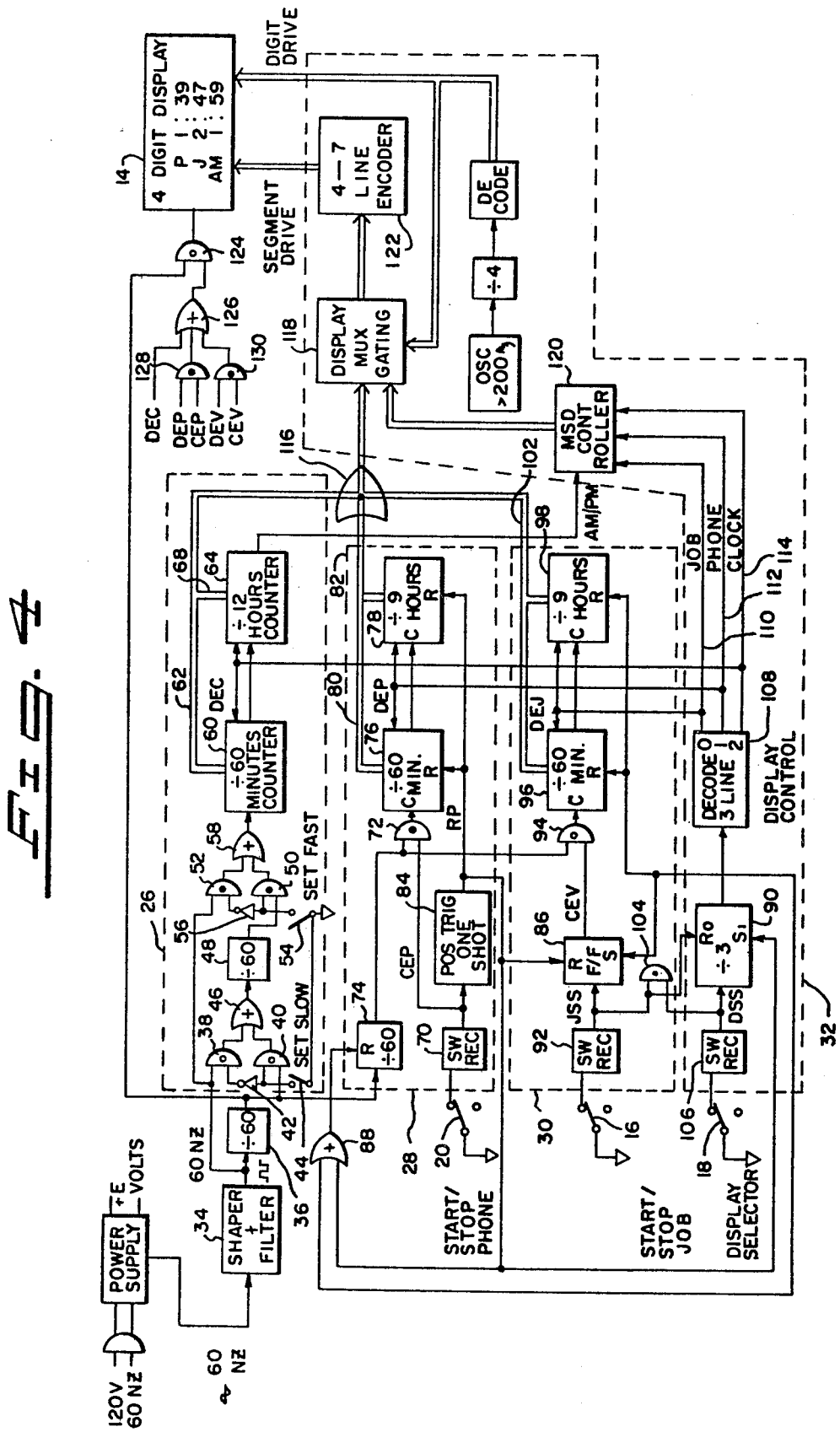
FIG. 4 is a schematic block diagram illustrating a preferred embodiment of the present invention.

Referring to FIG. 1, an improved telephone timer device 10 in accordance with the invention is shown situated beneath a telephone 12.

The physical appearance of the telephone timer device 10 is characterized by a digital display 14 and a pair of control buttons 16 and 18. The control button 16 serves to start and stop the timing of a job. The control button 18 controls the changing of the display to one of three data sets, to wit: actual time, telephone call time duration, or job time duration.

The timer device 10 is further characterized by having a switching or sensor device such as a pressure switch 20 of conventional type, which is activated whenever the receiver 22 of the telephone 12 is converted to an off-hook position, such as when the telephone is being used. It is noted at this point that any other suitable sensing device may be used in place of the conventional pressure switch 20 which is readily adapted to be situated on or near the cradle for the telephone receiver 22 to detect an off-hook position.

Finally, the telephone timer device 10 is characterized by a flat plate-like portion 24 which permits the timer device 10 to be readily positioned in close proximity to the telephone without adding to the clutter of the table or desk top on which the telephone is situated. The weight of the telephone 12 on the plate 24 also serves to retain the telephone timer device in a generally fixed position when the control buttons 16 and/or 18 are being manipulated.

The digital display 14 shown in FIG. 1 exemplifies the appearance of a display of data for telephone call duration. A digit "P" serves to designate that the time information being displayed concerns a telephone call. The time information is displayed by the conventional use of four digits arranged in two pairs of digits separated by a colon. The two digits left of the colon designate hours and the two digits right of the colon designate minutes. Seconds are not displayed; but such information may be readily included should there be a need for seconds or any other time period.

Referring to FIG. 2, the display of job duration information also includes a four digit time display. The digit "J" is used as the designation for such job duration information.

As shown by FIG. 3, actual time would also be displayed by the use of the conventional four digit time format; but would be accompanied by the designation "AM" as shown, or by "PM".

The colon in the display is adapted to be illuminated by a blinking light whenever the display concerns a telephone call or job being activately timed.

Referring now to FIG. 4 of the drawings, an improved telephone timer device in accordance with the present invention essentially includes a time set control circuit 26, a telephone call timer control circuit 28, a job timer control circuit 30, and a display control circuit 32.

Generally considered, the time set control circuit 26 operates to apply to the four digit display circuit 14 appropriate signals for altering the time display to have such time accurately set as is discussed in greater detail hereinafter. The time set control circuit 26 is designed to have both a fast set control signal as well as a slow set control signal generated to permit both rapid as well as slower advancing of the time display in the process of setting.

The telephone call timer control circuit 28 serves to effectively generate time signals which are incremented by the minute for the duration of a telephone call being timed. The telephone call timer control circuit 28 is adapted to be automatically started and stopped by the use of a switch or sensor 20 that is responsive to the use and non-use of the telephone.

Similarly, the job timer control circuit 30 serves to generate time signals which are incremented by the minute and which are able to be displayed on the four digit display. Unlike the telephone call timer control circuit 28, the job timer control circuit 30 is designed to be manually started and stopped for the purpose of initiating and halting the timing of a job or chore. Also unlike the telephone call timer control circuit 28, the job timer control circuit 30 is designed to permit the timing process to be interrupted and reassumed at a later time.

The display control circuit 32 generally serves to permit selection of one of the three possible displays previously mentioned.

Considering now the circuitry of the present invention in greater detail, the improved telephone timer device 10 is adapted to be connected to the conventional electrical outlet providing 120 volts, 60 Hz-AC power. The 60 Hz signal is applied to a signal shaper and filter circuit 34 which serves to remove noise and have the sinusoidal wave shaped into a square wave to be suitable for use with conventional digital circuitry. The 60 Hz signal is applied to a divider circuit 36 which serves to provide a pulsed output signal having a pulse rate of one pulse per second (pps).

The time set control circuit 26 is connected to receive both the 60 Hz signal from the filter circuit 34 as well as the 1 pps signal generated by the divider circuit 36. Such signals are respectively connected to be applied as one of two inputs to AND gates 38 and 40. The second input of the AND gate 38 is connected via an inverter circuit 42 and a slow set switch 44 to ground potential such that when the switch 44 is closed or enabled, the AND gate 38 provides a 60 Hz output signal which is applied to an OR gate 46. When the set switch 44 is opened or disabled, the AND gate 40 provides a 1 pps output signal. The output of the AND gate 40 is applied to the OR gate 46 which serves to transmit signals applied thereto through a divider circuit 48 which serves to reduce the frequency of signals applied thereto by a factor of sixty. The output signals of the divider circuit are applied as one of two input signals to an AND gate 50.

The 60 Hz signal provided by the filter circuit 34 is also applied as one of two inputs to an AND gate 52. The second of the two inputs of the AND gates 50 and 52 are connected to ground potential via a fast set switch 54 whereby when closed the second of the two inputs of the AND gate 50 is connected to ground potential while the second of the two inputs of the AND gate 52 is connected to the fast set switch 54 via an inverter circuit 56.

Operationally, a 60 Hz signal is applied by the AND gate 52 to an OR gate 58 whenever the fast set switch 54 is closed while a 1 pulse per minute signal is applied from the AND gate 50 to the OR gate 58 when the fast set switch is open.

Considering operation of the slow set switch 44 and the fast set switch 54 in combination, the output of the OR gate 58 will be a 60 Hz signal when the fast set switch 54 is closed and the slow set switch 44 is open, a 1 pps signal when fast set switch 54 is open and slow set switch 44 is closed, and a 1 ppm signal when both switches 54 and 44 are opened as in normal operation. Hence, the clock display is incremented at one minute intervals.

The output of the OR gate 58 is applied to a minutes counter 60 which serves to generate minutes data signals which are outputted and applied to the digital display 14 via composite leads 62. The output of the minutes counter 60 is also used to increment an hours counter 64 via a lead 66. The hours counter 64 serves to generate hour data signals which are ultimately applied to the digital display 14 via composite leads 68.

Considering the foregoing, it is clear that the hours counter 64 will increment at a rate of 1 pps when the fast set switch 54 is closed and at a rate of 1 ppm when the slow set switch 44 is closed. Similarly, the minutes counter 60 will increment at a rate of 60 pps when the fast set switch 54 is closed and at a rate of 1 pps when the slow set switch is closed. The correct time can thus be easily set on the digital display 14 by the use of the set switches 44 and 54. Of course, in normal operation, the hours counter will increment at a rate of one pulse per hour and the minutes counter is incremented at a rate of 1 ppm.

As earlier discussed, the telephone call timer control circuit 28 is responsive to the operation of a switch 20 that may be mounted on the cradle of a telephone 12 to be closed, and hence detect the telephone receiver 22 being removed from the cradle to an off-hook position. An inductive pickup device near the telephone or any other conventional means responsive to operation of the telephone may be used as an alternative to the switch 20.

Closure of the switch 20 causes a switch receiver 70 to generate a clock enable phone (CEP) signal. The switch receiver 70 essentially serves to condition the signal generated by closure of the switch for use in digital circuitry as is conventional and well known. Such conditioning may include amplification, filtering, debouncing, squaring and level shifting. The CEP signal is applied from the receiver 70 to an AND gate 72 and serves to enable a 1 ppm signal provided by a divider 74 to be applied through the AND gate 72 to a minute counter 76 and an hour counter 78. The counters 76 and 78 respectively provide time data signals via composite output leads 80 and 82 which are capable of being applied to the digital display 14 to produce the desired time display.

The leading edge of the CEP signal when applied to a one shot circuit 84 causes a reset phone (RP) pulse to be generated. The RP pulse is connected to be applied to the counters 76 and 78 to reset the counters to zero (0) each time the switch 20 is closed to thereby have each telephone call independently timed. It is noted that until a telephone receiver is replaced on the telephone cradle, the telephone call timer will continue to count, and, hence, in order to have each of several successive telephone calls separately timed, the switch 20 must be opened and reclosed prior to each successive call. It is further noted that once a telephone call has been completed and the telephone receiver replaced in its cradle, the counters 76 and 78 continue to store the time information relative to the last telephone call that was timed and such information may be displayed on the digital display 14 at any later time prior to such switch 20 being again closed when the receiver is removed from the telephone cradle.

The RP pulse is also applied to the job timer control circuit 30 and serves to automatically cause the timing of a job to be temporarily discontinued and placed in a hold or pause condition for the duration of a telephone call. This is accomplished by having the RP signal applied to a flip flop 86, the operation of which shall be described in greater detail hereinafter. The RP signal is also applied to an OR gate 88 to reset the divider 74. Such resetting of the divider 74 permits the divider 74 to be synchronized with the closure of the switch 20 to have the first pulse generated by the divider 74 occur exactly 60 seconds after the closure of the switch 20 attendant to an off-hook condition for the telephone receiver.

The RP pulse is also applied to a divide-by-three display control counter 90 included in the display control circuit 32 for the purpose of having the display circuit 32 set to the one of its three counts or states in which corresponds to the display of telephone time data.

The job timer control circuit 30 is substantially similar to the telephone call timer control circuit 28. As shown, closure of the switch 16 causes a switch receiver 92 to generate a job switch signal (JSS) which is applied to toggle the flip flop 86 to have it generate a clock enable job (CEJ) signal. Such a CEJ signal is applied to an AND gate 94 as one input thereof, and enables the 1 ppm signal provided from the divider 74 to be outputted by the AND gate 94 to the minute counter 96. As shown, the minute counter 96 is connected to an hour counter 98 which in combination therewith generates minute and hour signals which are suitable for causing the desired display of time on the digital display 14 when applied thereto via composite leads 100 and 102.

The switch 16 may be of a type that automatically reverts to an open position after being closed. Whenever the switch 16 is closed or engaged, the resulting signal provided from the switch receiver 92 is applied to the flip flop 86 to cause the CEJ signal to change state (either from 0 to 1, or from 1 to 0) which serves to enable or disable the AND gate 94 to permit or to halt any counting by the counters 96 and 98. In short, the switch 16 has the capability of both starting as well as stopping the counting being accomplished by the counters 96 and 98.

The output of the switch receiver 92 of the job timer control circuit 30 is also applied as an input to the counter 90 of the display selector control circuit 32 to have such counter generate the count or signal corresponding to the display of job time data.

Resetting of the job timer control circuit 30 and the counters 96 and 98 included therein is accomplished by having the output of the switch receiver 92 applied as one input to an AND gate 104 along with the output of a switch receiver 106 which is connected as shown to the display selector switch 18. Depression or operation of both of the switches 16 and 18 simultaneously causes the AND gate 104 to provide a reset pulse which is applied to the counters 96 and 98, the flip flop 86, and the divider 74 via OR gate 88 to produce resetting.

The display control circuit 32 is operated by depression or closure of the switch 18 which also may be designed to be automatically opened after each closure. Each closure of the switch 18 serves to have the switch receiver 106 apply an output signal to the counter 90 to cause stepping through each of its three different states, i.e., 0, 1 and 2. The output of the counter 90 is applied to a 3-line decoder circuit 108 which serves to produce an output on one of the three output leads 110, 112, or 114 corresponding to the state of the counter 90. For reference purposes, it may be assumed that the 0 state of the counter corresponds to the job time data, state 1 corresponds to the telephone call time data, and state 2 corresponds to actual time or clock information. Accordingly, whenever the counter 90 is in state 2 the decoder 108 provides an output signal on the output lead 114. Such signal is applied as a display enable clock (DEC) signal to the counters 60 and 64 to enable information to be outputted through an OR gate 116 for application to a display multiplexor circuit 118 and ultimately to the display 14.

Whenever the counter 90 is in state 1, the decoder 108 provides an output on lead 112 which is provided as a display enable phone (DEP) signal to the counters 76 and 78 of the telephone call timer control circuit 28. Finally, whenever the counter 90 is in state 0 the decoder 108 provides an output signal on lead 110 which is applied as a display enable job (DEJ) signal to the counters 96 and 98 included in job timer control circuit 30.

The display control signals provided on the leads 110, 112, and 114 are applied to a most-significant-digit controller circuit 120 which is connected to the multiplexing circuit 118. A carry out signal from the 12 hour counter 64 is also applied to the controller circuit 120 for the purpose of providing a signal properly timed to effect display of the AM or PM designations in conjunction with the display of clock data or actual time. The controller circuit 120 also causes a P to be displayed when telephone time data and a J to be displayed with a job time data, besides the AM or PM that is displayed along with clock data. Such designations, as earlier explained, permit a user or observer of the time display 14 to readily identify which data is being displayed. A suitable line encoder 122 may be used to electrically couple the multiplexer 118 to the digital display device 14 so as to make such devices compatable. It is to be understood that the controller circuit 120, the multiplexor 118 and the encoder circuit 122 may all be of conventional design and of a type that is suitable to have the signals generated by the counters included in the set control circuits 26, telephone call time control circuit 28, and job time control circuit 30 appropriately displayed on the digital display device 14. Indeed multiplexing may be omitted if a savings in the number of wires to the display device 14 is undesirable or unimportant or not possible due to the type of display device 14 being used, i.e., liquid crystal devices.

The digital time display, as earlier explained, includes a colon in its format. The colon is illuminated to indicate whether the displayed time information is actively being incremented or is in a pause or non-counting mode of operation. Such active or incrementing counting may be indicated by a flashing of the colon at a uniform rate such as 1 pps. To this end, the display device 14 is connected to receive the output of an AND gate 124 which has one of its two inputs connected to receive a 1 pps signal from the divider circuit 36. The second of the two input leads of the AND gate 124 is connected to the output of an OR gate 126 which serves to provide an input signal to the AND gate 124 whenever the display is in a clock or actual time display mode. This is accomplished by having the DEC signal applied from the decoder 108 to the OR gate 126.

Similarly, flashing of the colon in the display is accomplished for telephone time data whenever the DEP signal is provided to an AND gate 128 simultaneously with the application thereto of the CEP signal generated by the switch receiver 70 whenever the switch 20 has been closed to initiate timing of a telephone call.

Flashing of the colon when job time data is being displayed occurs whenever the DEJ signal is applied to an AND gate 130 from the decoder 108 simultaneously with the application of a CEJ signal provided by the flip flop 86 indicating that a job is being actively timed.

It is to be understood that it is possible to have both a job and a telephone call being timed simultaneously. From the foregoing, it is clear that once timing of a telephone call is initiated by closure of the switch 20, that the switch 16 may thereafter also be operated to resume the timing of a job already being timed prior to such timing being automatically interrupted and placed in a pause or hold condition due to operation of the switch 20. Should the job timing remain in a pause or hold condition, the prior count effectively remains in memory until the job timing is resumed by operation of the switch 16.

As earlier stated, the display selector switch 18 may be itself operated at any time to change the display appearing on the digital display 14 without affecting in any way the timing of a job and/or telephone call in process.

It is now clear from the foregoing description that the present invention provides a telephone timer device which may be conveniently employed to time telephone calls and other office tasks and to provide standard clock information in an efficient and simple manner with a device that can be inexpensively manufactured.

While a preferred embodiment of the present invention has been described hereinabove, it is intended that all matter contained in the above description and shown in the accompanying drawings be interpreted as illustrative and not in a limiting sense, and that all modifications, constructions and arrangements which fall within the scope and spirit of the invention be made.

I claim:

1. A time display device for use with a telephone subscriber handset comprising:
   (a) time display means;
   (b) a display control circuit connected to said time display means for controlling the time display mode of said time display means and for advancing time display signals to said time display means;
   (c) a call time duration circuit operatively responsive to the operation of said telephone subscriber handset for producing time display signals representative of the call time duration of a telephone call and connected to said display control circuit for applying to said time display means time display signals representative of the call time duration of a telephone call for the display of the call time duration on said time display means;
   (d) interval time duration circuit having start-stop switching means and operatively responsive to the actuation of said start-stop switching means thereof for producing time display signals representative of the start-stop interval duration and connected to said display control circuit for applying to said time display means time display signals representative of the start-stop interval duration on said time display means; and (e) display mode selector switching means connected to said display control circuit for activating said display control circuit to select the time display mode for said time display means, said display mode selector switching means produces pulses and said display control circuit includes pulse counting means responsive to said pulses produced by said display mode selector switching means for selecting the time display mode of said time display means, said display control circuit including decoding means operatively responsive to said pulse counting means and connected to said call time duration circuit and said interval time duration circuit for enabling the respective advancement of said time display signals representative of said call time duration of a telephone call and said time display signals representative of the start-stop interval duration of said time display means, said display mode selector switching means being connected to said call time duration circuit for producing pulses for selecting the call time duration mode of said time display means in response to said telephone subscriber handset initiating the operation of said call time duration circuit.

2. A time display device as claimed in claim 1 wherein said display control circuit includes multiplexing means connected to said decoder means and said call time duration circuit and said interval time duration circuit for advancing respectively to said time display means time display signals representative of the call time duration of a telephone call and the start-stop interval duration.

3. A time display device as claimed in claim 2 and comprising a horological information circuit for producing time display signals representative of horological information and connected to said display control circuit for applying to said time display means time display signals representative of horological information, said display mode selector switching means and said pulse counting means being operative for selecting a horological information mode for said time display means.

4. A time display device as claimed in claim 3 wherein said decoding means is operatively responsive to said pulse counting means and is connected to said horological information circuit for enabling the advancement of said time display signals representative of horological information to said time display means.

5. A time display device as claimed in claim 4 wherein said multiplexing means is connected to said decoder means and said horological information circuit for advancing time display signals representative of horological information to said time display means.

6. A time display device as claimed in claim 1 wherein said call time duration circuit comprises:
(a) switching means responsive to the operation of said telephone subscriber handset for activating said call time duration circuit and for deactivating said call time duration circuit;
(b) a multivibrator circuit connected to said switching means for producing a reset pulse for said call time duration circuit at the initiation of each activation of said call time duration circuit to clear said call time duration circuit for producing time display signals representative of the call time duration of a telephone call; and
(c) a time display signal counting circuit connected to said switching means and operative during the activation of said call time duration circuit to produce said time display signals representative of the call time duration of a telephone call, said time display counting circuit for said time duration circuit being connected to said multivibrator circuit and being reset at the initiation of each activation of said call time duration circuit by a reset pulse produced by said multivibrator to clear said time display signal counting circuit for producing time display signals representative of the call time duration of a telephone call.

7. A time display device as claimed in claim 8 wherein said interval time duration circuit is connected to said call time duration circuit to be temporarily interrupted for the duration of a telephone call when said multivibrator circuit produces said reset pulse.

8. A time display device as claimed in claim 7 and comprising a time pulse generating circuit connected to said horological information circuit for initiating time display signals representative of horological information and connected to said call time duration circuit for initiating time display signals representative of the call time duration, said interval time duration circuit being connected to said call time duration circuit for initiating time display signals representative of the start-stop interval duration.

9. A time display device as claimed in claim 8 wherein said multivibrator circuit resets said time display counting circuit for said call time duration circuit for the initiation of said time display signals representative of the call time duration to synchronize the initiation of said time display signals representative of the call time duration with the activation of said switching means.

10. A time display device as claimed in claim 7 wherein said display mode selector switch produces pulses for selecting the call time duration mode of said display means in response to said reset pulse produced by said multivibrator circuit.

* * * * *